United States Patent [19]

Johnson

[11] Patent Number: 4,470,938

[45] Date of Patent: Sep. 11, 1984

[54] METHOD AND APPARATUS FOR EXTRUSION OF THERMOPLASTIC FOAM

[75] Inventor: D. Emil Johnson, Canandaigua, N.Y.

[73] Assignee: Mobil Oil Corporation, New York, N.Y.

[21] Appl. No.: 412,438

[22] Filed: Aug. 27, 1982

[51] Int. Cl.³ .............................................. B29D 27/00
[52] U.S. Cl. ..................................... 264/50; 261/82; 264/DIG. 5; 425/4 C
[58] Field of Search .................. 264/50, DIG. 5; 425/4 C; 261/82

[56] References Cited

U.S. PATENT DOCUMENTS

| | | | |
|---|---|---|---|
| 2,460,004 | 1/1949 | Green et al. | 261/82 |
| 2,549,258 | 4/1951 | Stover | 261/82 X |
| 3,080,154 | 3/1963 | Tanner | 261/82 X |
| 3,316,335 | 4/1967 | Snella et al. | 264/50 |
| 3,523,988 | 8/1970 | Roehr et al. | 264/50 X |
| 3,756,576 | 9/1973 | Tremolada | 261/82 X |
| 3,981,649 | 9/1976 | Shimano et al. | 264/50 X |
| 4,043,715 | 8/1977 | Hendry | 264/50 X |
| 4,211,523 | 7/1980 | Hunerberg | 264/50 X |
| 4,381,272 | 4/1983 | Ehritt | 264/50 X |

*Primary Examiner*—Philip E. Anderson
*Attorney, Agent, or Firm*—A. J. McKillop; M. G. Gilman; C. J. Speciale

[57] ABSTRACT

A method and apparatus for continually metering a gaseous blowing agent in an accurate and precise manner into a molten resin charge, such as polystyrene. This is accomplished by a free piston-cylinder combination which is actuated by the gas blowing agent and which continually meters discrete uniform volumetric charges of the gaseous agent into the molten resin. The blowing agent is uniformly distributed throughout the resin charge and extruded into a region of lower pressure to yield a foamed structure.

13 Claims, 2 Drawing Figures

METHOD AND APPARATUS FOR EXTRUSION OF THERMOPLASTIC FOAM

BACKGROUND OF THE INVENTION

In the manufacture of polystyrene foam sheet, rod, or other stock material, the method wherein heated and pressurized styrene resin is mixed with a foaming agent and then extruded to a low pressure zone is well known and widely used. The foam is thereafter subjected to a thermoforming step to make articles such as foam cups, sandwich containers, meat trays, etc. Some of the organic blowing agents employed have a solvating effect on the styrene resins. If the solvating effect is too great, deficiencies, such as sagging of the foam sheet, are encountered during subsequent thermoforming. In order to cope with this, extended aging has been found to be necessary. During this aging process a change takes place which results in an elimination or minimizing of the tendency of the polystyrene sheet to sag during thermoforming. It is believed that during aging the foam cells in the polymeric matrix become partially depleted of volatile hydrocarbons, which enter the atmosphere. It would be an advance in the state of the art if foamed polymer could be prepared without an excess of foaming agent. It also would be of considerable economic advantage if this could be accomplished with a system of low capital expense.

It is an object of the present invention to provide an extrusion process for utilizing a foaming agent maintained in gas form from injection through foam extrusion.

It is another object to provide an apparatus for utilizing a gas foaming agent and maintaining it in the gas form throughout the process. Yet another object of the present invention is to provide a process and apparatus utilizing precise control of the rate of introduction of a gas foaming agent into a foamable polymer.

SUMMARY OF THE INVENTION

Figure 1:
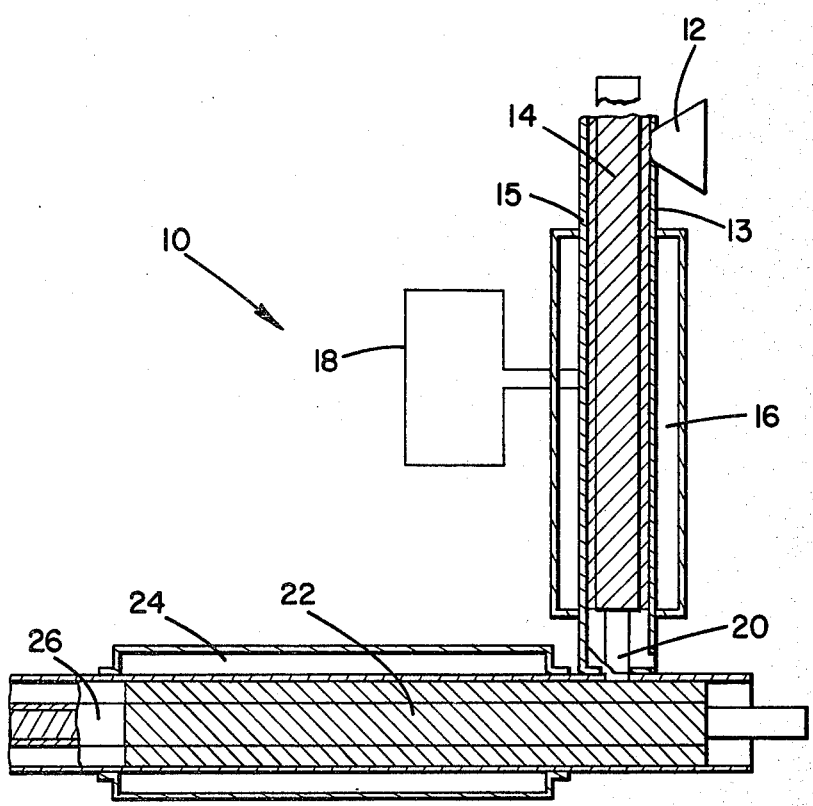
FIG. 1 is a schematic view of an extrusion system in which the method and apparatus of the present invention may be employed.

The present invention relates to a process for preparing a thermoplastic resin foam structure comprising: introducing, to a molten resin charge under pressure, a gas blowing agent from a supply gas source of comparatively higher pressure, said introducing being by means of discrete uniform volumetric charges of gas into said resin; uniformly distributing said blowing agent throughout said polymer; and extruding the combination into a region of lower pressure to yield a foam structure.

The invention also relates to a continuous process for thermoplastic resin foam production comprising:

(a) feeding a foamable thermoplastic resin charge to a screw type extruder and heating the charge, under pressure, to a first temperature above the melting temperature thereof;

(b) injecting a gas blowing agent into said charge, said injecting being by means of discrete uniform volumetric charges of said gas into said resin from a supply gas source of comparatively higher pressure;

(c) uniformly mixing said gas and resin.

(d) cooling the mixture to a second temperature below the first temperature and above the melting temperature of said resin; and (e) extruding a foamed sheet of thermoplastic resin into a zone of lower pressure.

The invention further relates to an extrusion apparatus or system adapted for the production of thermoplastic resin foam from a mixture comprising molten resin and a gas blowing agent comprising:

(a) a pressurizable melting and mixing zone having an elongated screw disposed within an elongated barrel, said barrel having an inlet end and an outlet end;

(b) a gas blowing agent injection system communicating with said barrel, said system comprising (1) a pressurized gas source, (2) a free piston and cylinder combination in communication with and powered by said gas source, (3) means in association with said free piston-cylinder combination for cycling said piston, (4) a gas conduit in communication with said cylinder and said elongated barrel to accommodate introduction of gas into said barrel on each stroke of said piston; and (5) means for controlling said piston cycling rate.

DETAILED DESCRIPTION OF THE INVENTION

While the process of the present invention is applicable to a wide variety of thermoplastic resins, for illustration purposes it will be described with respect to amorphous linear addition polymers of ethylenically-unsaturated monomers, such as styrene, p-methylstyrene, ethylene or other alpha-olefins and mixtures thereof. The preferred materials are styrenic homopolymers or interpolymers containing a predominant amount of styrene or substituted styrene. Commerically available polystyrene such as Dow 685, or similar general purpose resins manufactured by Mobil Chemical Company and Foster Grant, can be employed in the subject process.

The contemplated blowing or foaming agent of the present invention are the atmospheric gases by which is meant one or more of the gases which normally make up our atmosphere. More specifically these gases include air, $CO_2$, nitrogen, helium, steam, methane, ammonia, the inert gases such as argon, neon, etc and mixtures of these gases. Contemplated mixtures include air and $CO_2$, $CO_2$ and nitrogen, air further mixed with nitrogen, nitrogen and helium, etc.

The process of the present invention and the apparatus is described with reference to the above-identified drawings. FIG. 1 is illustrative of a type of extrusion system which may employ the novel method and apparatus of the present invention. A solid thermoplastic material, e.g. polystyrene in the form of pellets, may be introduced into a hopper 12 located at the inlet end of a primary screw extruder 13. The primary extruder 13 is a standard rotating screw type extruder wherein the thermoplastic resinous pellets are advanced by the rotation of a screw member 14 and, during their advancement, are melted by the shearing action of the flights of the screw forcing the material against the interior of a barrel 15 of the primary extruder. Additional heating means such as a heated fluid in a heating jacket 16 may surround the barrel of the primary extruder 13. After the thermoplastic material has been melted, and a foaming gas may be introduced into the molten mixture by means of a gas injection system 18, more specifically described with reference to FIG. 2. After blending and intimately mixing the atmospheric blowing agent into the molten polymer, the mix is transferred from the primary extruder 13 to a secondary or cooling rotation screw extruder 22 by way of conduit 20. Cooling extruder 22 is equipped with a cooling jacket 24 containing a cooling fluid. The mix is transported through extruder 22 to its outlet region containing an annular die member 26 where upon passage through the die member a foamed thermoplastic tube, not shown, is formed.

Figure 2:
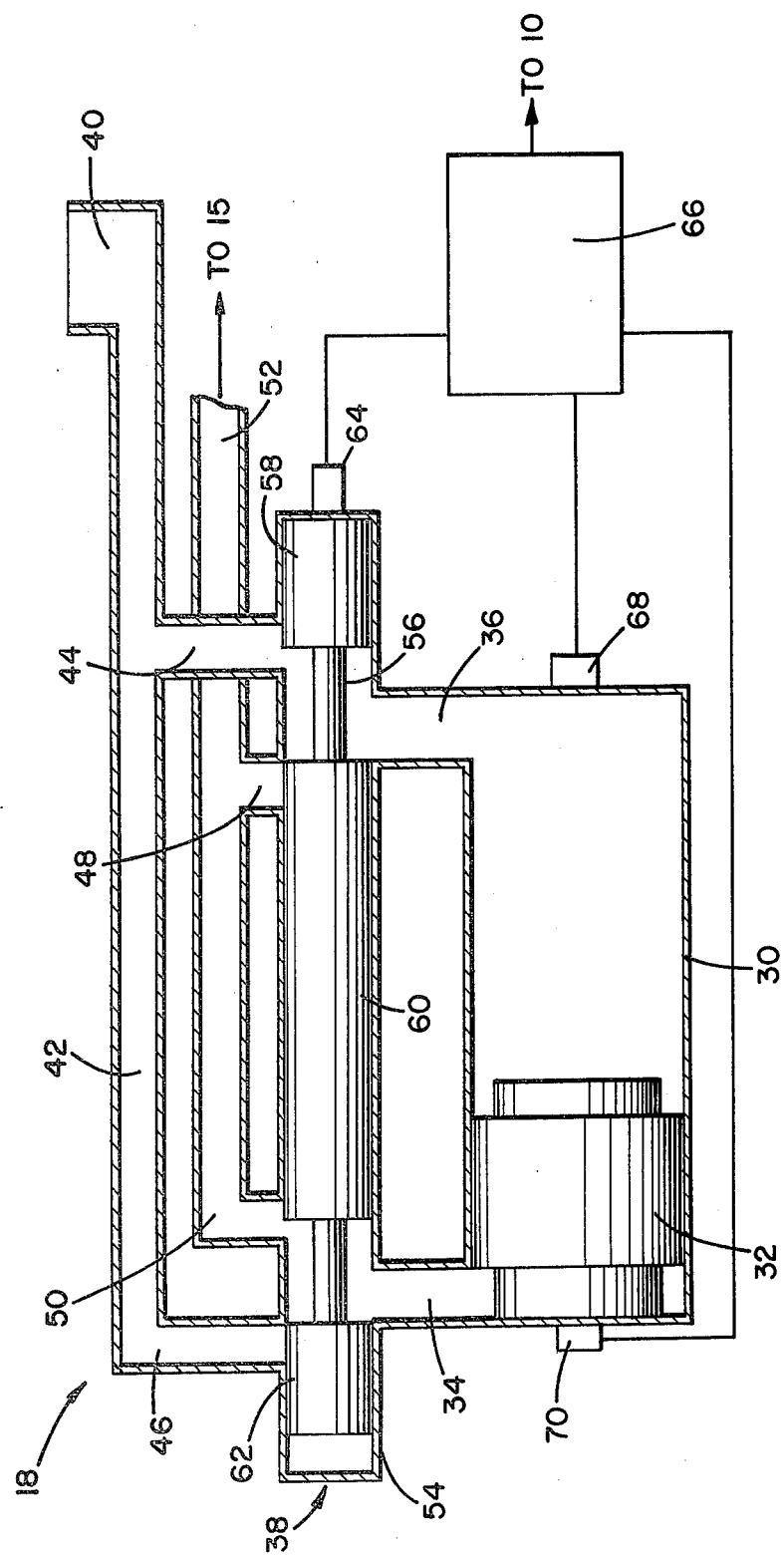
FIG. 2 is a schematic view of a foaming agent gas injection system employable in the method and apparatus of the present invention.

FIG. 2 shows a gas injection system 18 which, for purposes of illustration, defines a free piston-cylinder combination cycled by a spool valve device. The system 18 includes a cylinder 30 within which is a free piston 32. At each end of said cylinder are conduits 34 and 36 which are each alternately a gas inlet conduit for gas powering said piston and a gas outlet conduit for accommodating outlet gas from said cylinder. A spool valve device 38 is in communication with said piston-cylinder combination via conduits 34 and 36 and with a pressurized gas supply source 40, via gas supply conduits 42, 44 and 46 and with barrel 15 of FIG. 1, via gas outlet conduits 48, 50 and 52.

The spool valve device 38 basically comprises shuttle on raciprocal member within a tube or cylinder which member is designed to open two conduits while simultaneously closing two conduits on each stroke of the shuttle. Thus, as shown, cylindrical passageway 54 has opened which communicate with conduits 34, 36, 44, 46, 48 and 50. Shuttle member 56 carries three piston members 58, 60 and 62 which, on reciprocation of the shuttle member, opens conduit 44 while closing conduit 46 and opening conduit 50 while closing conduit 48. On the reverse cycle conduit 44 is closed while conduit 46 is opened and conduit 50 is closed while conduit 48 is opened. Spool valve 38 can be actuated by any suitable device 64 e.g. a solenoid, in response to free piston rate control means 66. Means 66 is, for example in communication with appropriated sensors in extrusion system 10 which feeds information back to means 66 so that a predetermined ratio of blowing agent gas to molten polymer can be maintained constantly. This can be accomplished, for example by sensing the pounds per unit time output of the extruder. Means 66 can essentially be a minicomputer controlling the free piston rate. Proximity devices 68 and 70, e.g. switches can be actuated by magnets in opposite ends of the free piston. These devices, in communication with means 66, signal the system to reverse the spool valve so that an opposite thrust can occur.

On actuation, piston 32 expels gas from cylinder 30 through conduits 34, 50 and 52 to barrel 15 of primary extruder 13 in FIG. 1. On completion of its expulsion stroke, proximity device 70 signals for reverse of the spool valve and means 66 causes this reverse commensurate with a rate appropriate for a predetermined gas-molten resin ratio. The reverse thrust is propelled by the force of the gas pressure in source 40, through conduits 42, 46 and 34 expelling the gas in cylinder 30 through conduits 36, 48 and 52 to barrel 15.

The following is a specific example which employs the method and apparatus in the present invention. This example is given by way of illustration only and is in no way intended as limitative of the scope of the invention.

Example

Polystyrene pellets of approximately 1/16th inch diameter are admixed in a drum tumbler with a cell size control additive mixture comprising about 0.86 percent by weight of a mixture of sodium bicarbonate and citric acid. The cell size control additive mixture is utilized in the extrusion process to control the cell sized in the individual cells in the final polystyrene foam product. The mixture of the polystyrene pellets and cell size control additive mixture is discharged into feedhopper 12 of primary extruder 13. The charge progresses from the feed zone of extruder 13 to a heat plasticizing zone which is maintained at a temperature of from about 400° to about 450° F. The resulting molten mass is then progressed by the continuous rotation of the forwarding screw 14 of extruder 13 to a blowing agent injection zone 18. At this point, employing the system of FIG. 2, $CO_2$ gas at a pressure of about 6000 psi is injected at a rate of about 0.027 cubic feet per minute while the polystyrene foam is being extruded at a rate of about 1000 lbs. per hour. This is accomplished employing a free piston of about ½ inch diameter and a 4 inch stroke with 64 strokes per minute. The $CO_2$-molten polymer mixture is continuously forwarded to a mixing zone or terminal portion of the primary extruded 13 while maintaining the temperature at a range of from about 400° to about 450° F. The molten mixture is subsequently forwarded through conduit 20 into the secondary or cooling extruder 22 and during this transfer there is a pressure drop to approximately 2500 psi as the $CO_2$-polymer mixture is transported through the cooling extruder the temperature of the mix is reduced to from 250°-310° F. with the aid of cooling jacket 24. The mix is extruded through die 26 to yield the foamed polymer in sheet form.

By the foregoing technique very careful control of the ratio of foaming agent gas and molten polymer is maintained. It is to be understood that the dimensions of the piston and cylinder can be changed in order to effect the frequency of introduction of the gaseous foaming agent.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. The method of preparing a thermoplastic resin foam structure comprising:
    introducing, to a molten resin charge under pressure, a gas blowing agent from a supply gas source of comparatively higher pressure, said introducing being by means of discrete uniform volumetric charges of gas into said resin, wherein said discrete volumetric charges are introduced by means of a free piston-cylinder combination given motive power by said supply gas source;
    uniformly distributing said blowing agent throughout said resin charge; and
    extruding the combination into a region of lower pressure to yield a foam structure.

2. The method of claim 1 wherein said blowing agent is a member selected from the group consisting of carbon dioxide, air, nitrogen, steam, helium, methane, ammonia and any mixtures thereof.

3. The method of claim 1 wherein said foam structure is a styrene polymer.

4. The method of claim 3 wherein said styrene polymer is a member selected from the group consisting of polystyrene, poly-p-methylstyrene and mixtures thereof.

5. A continuous process for thermoplastic resin foam production comprising:
 (a) feeding a foamable thermoplastic resin charge to a screw type extruder and heating the charge, under pressure, to a first temperature above the melting temperature thereof;
 (b) injecting a gas blowing agent into the molten resin charge, said injecting being by means of discrete uniform volumetric charges of said gas into said resin from a supply gas source of comparatively higher pressure, wherein said discrete volumetric charges are introduced by means of a free piston-cylinder combination given motive power by said supply gas source;
 (c) uniformly mixing said gas and resin;
 (d) cooling the mixture to a second temperature below the first temperature and above the melting temperature of said resin; and
 (e) extruding a foamed sheet of thermoplastic resin into a zone of lower pressure.

6. The method of claim 5 wherein said atmospheric blowing agent is a member selected from the group consisting of carbon dioxide, air, nitrogen, steam, helium, methane, ammonia and any mixtures thereof.

7. The process of claim 5 wherein said resin charge is a styrene polymer.

8. The process of claim 7 wherein said styrene polymer is a member selected from the group consisting of polystyrene, poly-p-methylstyrene and mixtures thereof.

9. An extrusion apparatus adapted for the production of thermoplastic resin foam from a mixture comprising molten resin and a gas blowing agent in gas form, said apparatus comprising:
 (a) a pressurizable melting and mixing zone having an elongated screw disposed within an elongated barrel, said barrel having an inlet end and an outlet end;
 (b) gas blowing agent injection system communicating with said barrel between the ends of said barrel, said system comprising (1) a pressurized gas source, (2) a free piston and cylinder combination in communication with and powered by said gas source, (3) means in association with said free piston-cylinder combination for cycling said piston, (4) a gas conduit in communication with said cylinder and said elongated barrel to accommodate introduction of gas into said barrel on each stroke of said piston, and (5) means for controlling said piston cycling rate;
 (c) a resin cooling zone having an elongated screw disposed within an elongated barrel, said cooling zone barrel in communication with said melting and mixing zone;
 (d) means for turning said screws; and
 (e) an extrusion zone having an extrusion die in communication with said cooling zone.

10. The apparatus of claim 9 wherein said means for cycling said piston includes proximity sensor means at each end of said cylinder causing cycling of control valve means to open and close, at each end of said cylinder, conduits which are each alternately a gas inlet conduit for gas powering said piston and a gas outlet conduit for accommodating outlet gas from said cylinder.

11. The apparatus of claim 10 including piston cycle rate control means to cause continuous injection of a programmed ratio of gas to molten resin.

12. The apparatus of claim 11 wherein said control valve means is a spool valve.

13. The apparatus of claim 11 wherein said rate control means includes programmed microelectronic control means.

* * * * *